United States Patent
Gaard et al.

(10) Patent No.: US 9,514,874 B2
(45) Date of Patent: Dec. 6, 2016

(54) TRANSFORMER CHAMBER FOR A WIND TURBINE

(71) Applicant: SIEMENS AKTIENGESELLSCHAFT, München (DE)

(72) Inventors: Jesper Gaard, Odense S. (DK); Thorkil Munk-Hansen, Give (DK); Jacob Blach Nielsen, Engesvang (DK); Alex Yundong Wang, Herning (DK)

(73) Assignee: Siemens Aktiengesellschaft, München (DE)

( * ) Notice: Subject to any disclaimer, the term of this patent is extended or adjusted under 35 U.S.C. 154(b) by 0 days.

(21) Appl. No.: 14/540,665

(22) Filed: Nov. 13, 2014

(65) Prior Publication Data

US 2015/0061803 A1    Mar. 5, 2015

Related U.S. Application Data

(63) Continuation of application No. 13/593,841, filed on Aug. 24, 2012, now abandoned.

(30) Foreign Application Priority Data

Sep. 2, 2011  (EP) ..................................... 11179874

(51) Int. Cl.
  *H05K 5/00* (2006.01)
  *H01F 27/02* (2006.01)
  (Continued)

(52) U.S. Cl.
  CPC ............. *H01F 27/025* (2013.01); *F03D 80/82* (2016.05); *H01F 27/06* (2013.01); *H01F 27/085* (2013.01);
  (Continued)

(58) Field of Classification Search
  CPC .... Y02E 10/722; Y02E 10/726; Y02E 10/226; F03D 11/00; F03D 1/003; F03D 11/04; F03D 1/001; F03D 11/0058; F03D 80/82; Y02P 70/523; F05B 2240/14; F05B 2240/916; F05B 2230/61; F05B 2250/30; F05B 2260/96; H02K 7/1838; H02K 5/24; H02K 9/12; B66C 23/207; B66C 1/108; B66C 23/185; H01F 27/12; H01F 27/33; H01F 27/321; H01F 27/085; H01F 27/06; Y02B 10/30
  (Continued)

(56) References Cited

U.S. PATENT DOCUMENTS 7,075,192 B2 * 7/2006 Bywaters .............. F03D 7/0248
                                              290/44
2003/0071469 A1 * 4/2003 Becker .................... F03D 11/00
                                              290/55
(Continued)

FOREIGN PATENT DOCUMENTS

CN           2886770 Y      4/2007
CN         201092937 Y      7/2008
          (Continued)

*Primary Examiner* — James Wu

(57) ABSTRACT

A transformer chamber for a wind turbine is described. The transformer chamber includes a liquid-tight tank for receiving a liquid-filled, in particular oil-filled, transformer, a wind turbine structure component includes a component bedframe adapted for receiving such a transformer chamber and a wind turbine includes such a transformer chamber and such a wind turbine structure component. Furthermore, a method for assembling a wind turbine is described.

11 Claims, 7 Drawing Sheets

(51) Int. Cl.
  *H01F 27/12*  (2006.01)
  *H01F 27/06*  (2006.01)
  *H01F 27/08*  (2006.01)
  *H01F 27/32*  (2006.01)

(52) U.S. Cl.
  CPC ............ *H01F 27/12* (2013.01); *H01F 27/321* (2013.01); *F05B 2240/14* (2013.01); *Y02E 10/722* (2013.01)

(58) Field of Classification Search
  USPC .... 361/836; 174/12 R, 17 LR, 17.06, 17 LF; 336/58, 59, 94; 290/44, 55; 416/1, 204 R, 416/244 R
  See application file for complete search history.

(56) References Cited

U.S. PATENT DOCUMENTS

| | | | |
|---|---|---|---|
| 2007/0013193 A1 | 1/2007 | Galloway et al. | |
| 2011/0147115 A1* | 6/2011 | Ertl | G10K 11/16 181/202 |
| 2011/0260465 A1* | 10/2011 | Pedersen | F03D 1/001 290/55 |

FOREIGN PATENT DOCUMENTS

| | | | |
|---|---|---|---|
| CN | 101427023 A | | 5/2009 |
| CN | 201478092 U | | 5/2010 |
| CN | 101740202 A | | 6/2010 |
| CN | 101740204 A | | 6/2010 |
| CN | 201629503 U | | 11/2010 |
| CN | 201699340 U | | 1/2011 |
| CN | 102165539 A | | 8/2011 |
| DE | 29622637 U1 | | 4/1997 |
| DE | 102007062622 A1 | | 6/2009 |
| EP | 0447389 | * | 9/1991 |
| EP | 0447389 A2 | | 9/1991 |
| EP | 1101934 A2 | | 5/2001 |
| EP | 1677007 A2 | | 7/2006 |
| EP | 1764807 A1 | | 3/2007 |
| EP | 2007184 A2 | | 12/2008 |
| EP | 2063119 A2 | | 5/2009 |
| EP | 2109206 A1 | | 10/2009 |
| EP | 2151833 A1 | | 2/2010 |
| ES | 2333761 A1 | | 2/2010 |
| GB | 1387942 A | | 3/1975 |
| WO | 2005103489 A2 | | 11/2005 |
| WO | 2010040379 A1 | | 4/2010 |
| WO | 2010069315 A2 | | 6/2010 |

* cited by examiner

TRANSFORMER CHAMBER FOR A WIND TURBINE

CROSS REFERENCE TO RELATED APPLICATIONS

This application is a continuation of U.S. application Ser. No. 13/593,841 filed Aug. 24, 2012 and claims benefit thereof. This application further claims priority of European Patent Office application No. 11179874.0 EP filed Sep. 2, 2011. All of the applications are incorporated by reference herein in their entirety.

FIELD OF INVENTION

The present disclosure relates to the field of wind turbines. In particular, the disclosure relates to a transformer chamber, a wind turbine structure component, a wind turbine, and a method for assembling a wind turbine.

BACKGROUND OF INVENTION

Wind turbines becoming more and more popular for ecological power generation.

Power generated by wind turbines has to be transformed to be transportable via high voltage transmission lines to the consumers.

Liquid leaking from a liquid-filed transformer in case of a transformer failure may harm, in particular electrical and controlling, components near the liquid-filed transformer.

SUMMARY OF INVENTION

There may be a need for a transformer chamber, a wind turbine structure component, a wind turbine, and a method for manufacturing a wind turbine reducing the risk associated with leaking liquid.

This need may be met by the subject matter according to the independent claims. Advantageous embodiments of the present invention are described by the dependent claims.

According to a first aspect of the invention there is provided a transformer chamber for a wind turbine comprising a liquid-tight tank for receiving a liquid-filled, in particular oil-filled, transformer. This aspect of the invention is based on the idea that a second shell may limit the effect of transformer failures, as liquid originating from the transformer may be kept contained within the liquid-tight tank.

Liquid-filled transformers are used as they may allow for better heat dissipation from coils and transformer sheets during operation of the transformer. In particular, insulating liquids may be used for liquid-filled transformers. These insulating liquids may help to avoid corona formation and arcing within the transformer.

Some liquids like polychlorinated biphenyls may combine good insulating properties, i.e. a high dielectric strength, with good cooling properties. However, these liquids may be toxic. A transformer chamber with a liquid-tight tank may thus prevent that persons are exposed to these toxic substances.

Transformer oil has also been found to combine good cooling properties and insulating properties. However, transformer oil may be less fire-resistant. The liquid-tight tank may prevent that leaking transformer oil reaches surfaces having a temperature above a flame point of the transformer oil. Hence, a transformer chamber with a liquid-tight tank may prevent inflammation of the transformer oil.

The transformer chamber may comprise a pit, in particular an oil pit. The pit may allow collecting liquid, in particular transformer oil, during transformer chamber maintenance and reduce the amount of, e.g. toxic or burnable, substances within the transformer chamber.

According to an embodiment of the transformer chamber for a wind turbine, the transformer chamber comprises a liquid-filled transformer with low voltage terminals and high voltage terminals, wherein the low voltage terminals and high voltage terminals are accessible from a top surface of the transformer chamber.

This may reduce the time necessary for electrical installation of the transformer while at the same time maintaining the structural integrity of the liquid-tight tank. In particular, the transformer chamber may remain an essentially sealed tank such that no liquids may leak through the transformer chamber.

According to another embodiment of the transformer chamber for a wind turbine, the transformer chamber comprises a damper, in particular a damper including hydraulic cylinders. Typically, transformers have a quite high mass, because they are essentially composed of huge amounts of copper and iron. Providing the transformer chamber for a wind turbine with a damper may reduce the oscillations associated with the transformer being arranged in at the top of a wind turbine. Thus, the load on the wind turbine tower may be reduced.

According to yet another embodiment of the transformer chamber for a wind turbine, the liquid-tight tank is an explosion safe tank comprising an explosion plate, in particular an explosion plate made from aluminum.

Gas may be produced during operation of the transformer, which gas may explode. If the liquid-tight tank is constructed so as to be an explosion safe tank comprising an explosion plate the risk to damage elements near the transformer in case of a transformer explosion may be limited.

The explosion plate of the explosion tank may work as a predetermined breaking point. Thus, pressure due to the explosion may be released in a determined way.

Aluminum may be in particular suitable because of its lower strength compared to steel, which may the preferred material for the transformer chamber.

According to a still further embodiment of the transformer chamber for a wind turbine, the transformer chamber comprises guiding elements, in particular wheels.

These guiding elements may facilitate installation of the transformer chamber. Typically, the transformer chamber is installed at the top of the wind turbine, e.g. in the wind turbine nacelle or the wind turbine tower. The guiding elements, in particular wheels, may allow supporting the transformer chamber against the wind turbine tower either from the outside or form the inside when it is winched to the top. The exchangeability of the transformer chamber may likewise be improved.

According to a second aspect of the invention there is provided a wind turbine structure component comprising a component bedframe adapted for receiving a transformer chamber. The component bedframe may allow a particularly easy fixing of the transformer chamber to the wind turbine structure component.

According to a first embodiment of the wind turbine structure component, the wind turbine structure component comprises a cooling channel system.

During operation heat has to be dissipated from the liquid-filled transformer. Providing the transformer chamber with a cooling channel system may allow for heat dissipation by convection that may be more efficient than heat dissipation by radiation and/or conduction. In particular, the cooling channels may be construed to guide air trough fins of the liquid-filled transformer. Fins may augment the effective surface for heat dissipation.

According to second embodiment the wind turbine structure component comprises a damper, in particular a hydraulic cylinder damper.

Typically, transformers have a quite high mass, because they are essentially composed of huge amounts of copper and iron. Providing the wind turbine structure component with a damper may reduce the oscillations associated with the transformer being provided at the top of a wind turbine. Thus, the load on the wind turbine tower may be reduced.

According to another embodiment of the wind turbine structure component is a wind turbine tower segment.

If the wind turbine structure component is a wind turbine tower segment, the transformer chamber may be guided within the wind turbine tower during installation. Thus, installation of the transformer chamber may be performed in an environment protected from wind and rain. Furthermore, the transformer chamber may not be subjected to rotational forces when the wind turbine rotor is moved into the wind direction.

According to a yet another embodiment of the wind turbine structure component is a wind turbine nacelle.

The weight of the transformer may be beneficial when the wind turbine nacelle is adapted to receive the transformer chamber. The transformer may in this way be a counterweight to the wind turbine rotor.

Placing the transformer chamber at the top of the wind turbine may help to reduce the cable length from the generator or converter to the transformer, in particular when the transformer chamber is provided within the wind turbine nacelle.

According to a further embodiment the wind turbine structure component comprises a winch.

The winch may render allow for installation of the wind turbine chamber without providing a crane. Thus, installation of the wind turbine chamber may be cheaper, in particular for offshore wind turbines. All means to install the transformer chamber may be provided on site.

According to a still further embodiment the wind turbine structure component comprises a hatch. The hatch may allow moving the transformer chamber into the wind turbine structure According to another embodiment the wind turbine structure component comprises at least one cooling air inlet and at least one cooling air outlet adapted to provide the transformer chamber with cooling air.

During operation heat has to be dissipated from the liquid-filled transformer and the transformer chamber. Providing the transformer chamber with at least one cooling air inlet and at least one cooling air outlet adapted to provide the transformer chamber with cooling air may allow using the wind driving the wind turbine rotor to be used for cooling.

According to yet another embodiment the wind turbine structure component comprises a fan. A fan may augment the amount of air provided to the transformer chamber and/or other components of the wind turbine. Thus, even when there is few wind overheating of wind turbine components may be avoided.

According to a third aspect of the invention there is provided a wind turbine comprising a transformer chamber as has been described hereinbefore and a wind turbine structure component, wherein the transformer chamber is detachably connected to the component bedframe.

Such a wind turbine may be advantageous as it allows easy exchangeability of the transformer chamber and the transformer in case of a transformer failure.

Furthermore, installation of the wind turbine, in particular at offshore location, may be simplified.

According to an embodiment of the wind turbine the transformer chamber is movable, in particular in the direction of gravity, relative to the wind turbine structure component.

Such a wind turbine may further facilitate the installation of the transformer chamber within the wind turbine structure component. A wind turbine nacelle may, for example, be provided with a hatch at the bottom such that the transformer chamber may be winched through the opened hatched.

According to a forth aspect of the invention there is provided a method for assembling a wind turbine as has been described hereinbefore.

The method may in particular be useful to erect and to overhaul a wind turbine.

It has to be noted that embodiments of the invention have been described with reference to different subject matters. In particular, some embodiments have been described with reference to method type claims whereas other embodiments have been described with reference to apparatus type claims. However, a person skilled in the art will gather from the above and the following description that, unless other notified, in addition to any combination of features belonging to one type of subject matter also any combination between features relating to different subject matters, in particular between features of the method type claims and features of the apparatus type claims is considered as to be disclosed with this document.

The aspects defined above and further aspects of the present invention are apparent from the examples of embodiment to be described hereinafter and are explained with reference to the examples of embodiment. The invention will be described in more detail hereinafter with reference to examples of embodiment but to which the invention is not limited.

DETAILED DESCRIPTION OF INVENTION

Figure 1:
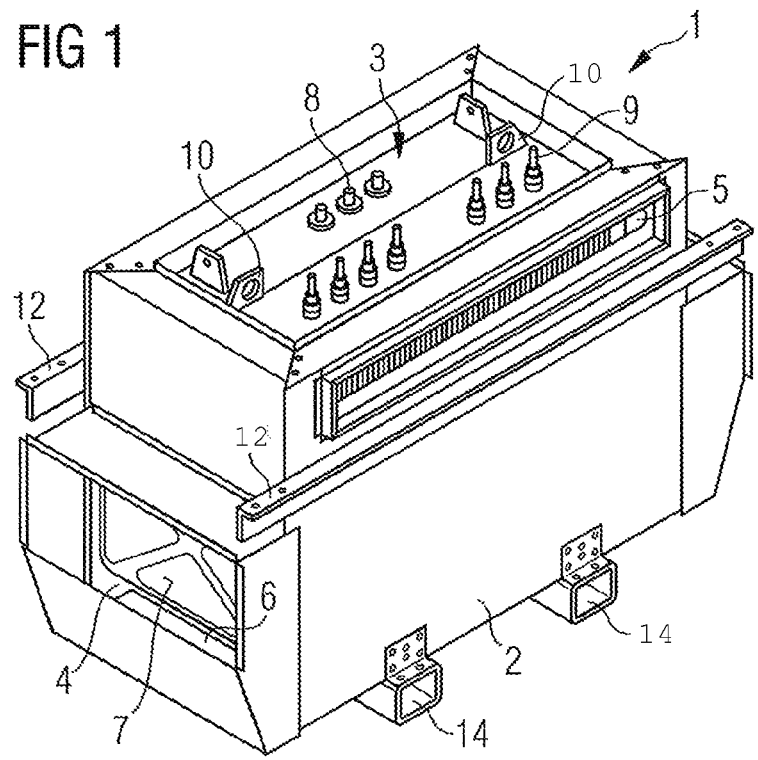
FIG. 1 shows a transformer chamber in a perspective view.

The illustration in the drawing is schematically.

FIG. 1 shows a transformer chamber 1 with an explosion safe tank 2 in a perspective view. The transformer chamber 1 surrounds an oil-filled transformer 3 only the top of which is visible. Air may flow through a first opening 4 into a cooling channel system of the transformer chamber 1, where it may absorb heat generated by the oil-filled transformer 3.

The hot air may then leave the cooling channel system of the transformer chamber 1 through a second opening 5.

The bottom section of the transformer chamber 1 up to the height of the first opening 4 may be formed as an oil pit 6. Leaking oil from a damaged oil-filled transformer, e.g. after an explosion of the oil-filled transformer, may be collected within the oil pit 6. An explosion plate 7 made of aluminum may work as a predetermined breaking point and may reduce the damages in case of an explosion of the oil-filled transformer 3.

An upper side of the transformer chamber 1 is open and allows easy access to a high voltage terminal 8 and a low voltage terminal 9 of the oil-filled transformer 3. This may allow a quick and easy replacement and reconnection of the oil-filled transformer 3 to electric wires. The top of the oil-filled transformer 3 further comprises transport rings 10, to which a hook or chain can be attached when an exchange of the oil-filled transformer 3 becomes necessary and the transformer chamber 1 with the oil-filled transformer therein needs to be lowered to or picked from surface level with a winch.

The transformer chamber 1 further comprises two support rails 12 which may be used to attach the transformer chamber 1 to a bedframe of, e.g. a wind turbine nacelle. Two support beams 14 may enhance the rigidity of the transformer chamber 1.

Figure 2:
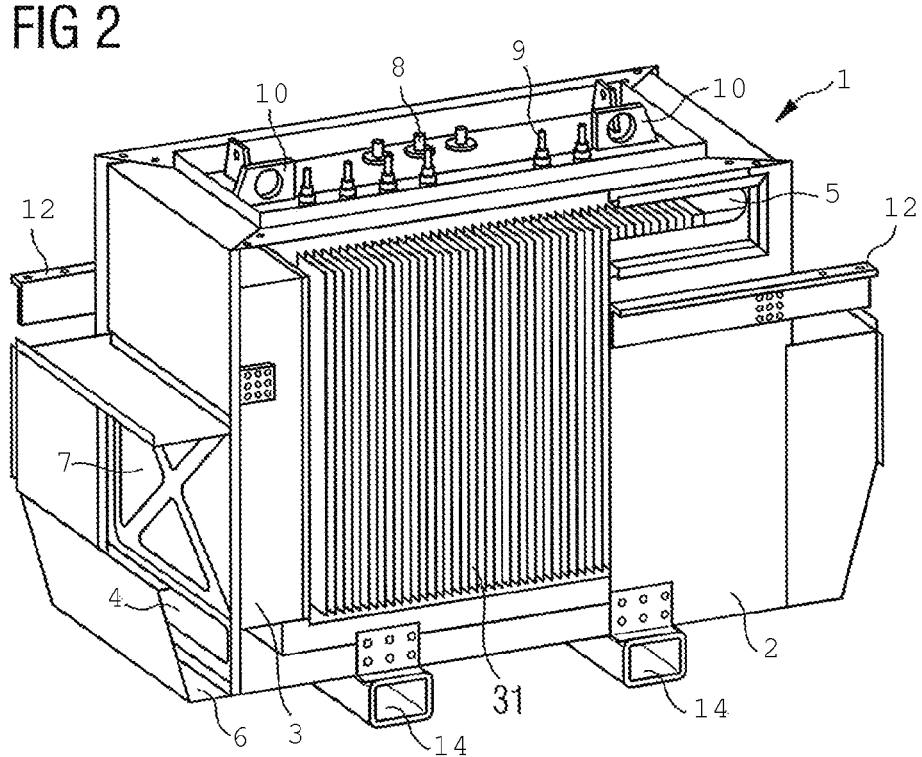
FIG. 2 shows a cutaway view of a transformer chamber.

FIG. 2 shows a cutaway view of a transformer chamber 1 with an explosion safe tank 2. The transformer chamber 1 comprises an oil-filled transformer 3, a first opening 4, a second opening 5, an oil pit 6, an explosion plate 7, a high voltage terminal 8, a low voltage terminal 9, transport rings 10, support rails 12, and support beams 14. The oil-filled transformer 3 is placed in the transformer chamber 1 such that the distance between cooling fins 31 of the oil-filled transformer 3 and the wall of the transformer chamber 1 is kept very narrow. The narrow arrangement forces the air coming from the first opening along the cooling fins 31 for better cooling of the surfaces of the oil-filled transformer 3.

Figure 3:
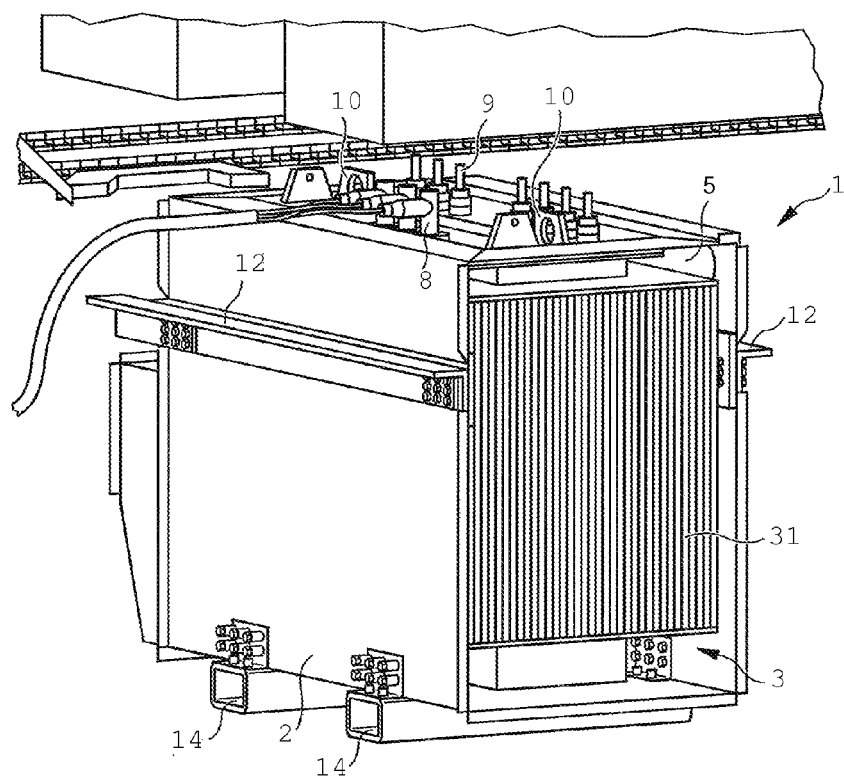
FIG. 3 shows another cutaway view of a transformer chamber.
Figure 4:
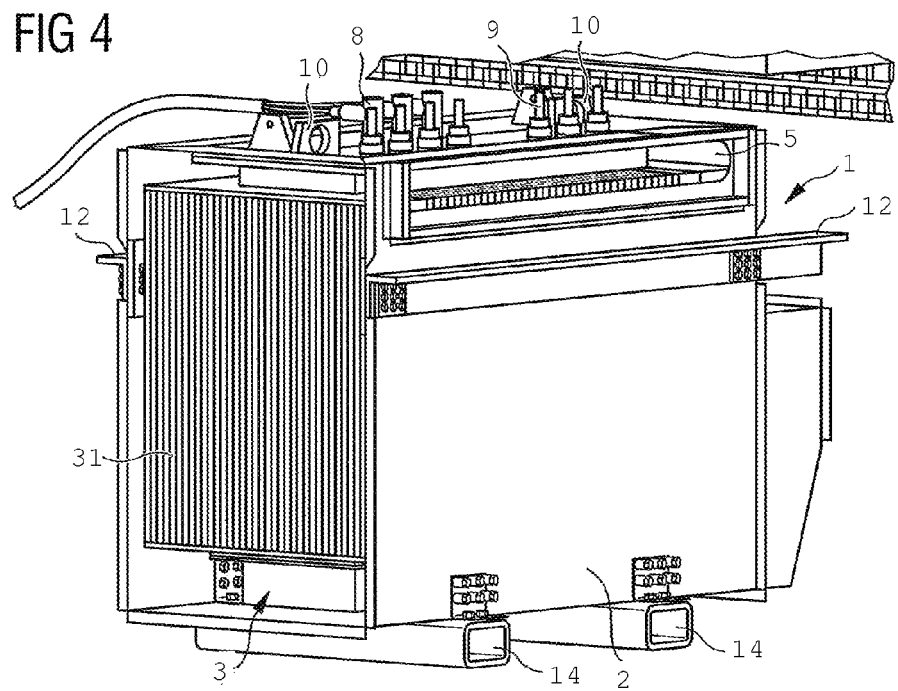
FIG. 4 shows yet another cutaway view of a transformer chamber.
Figure 5:
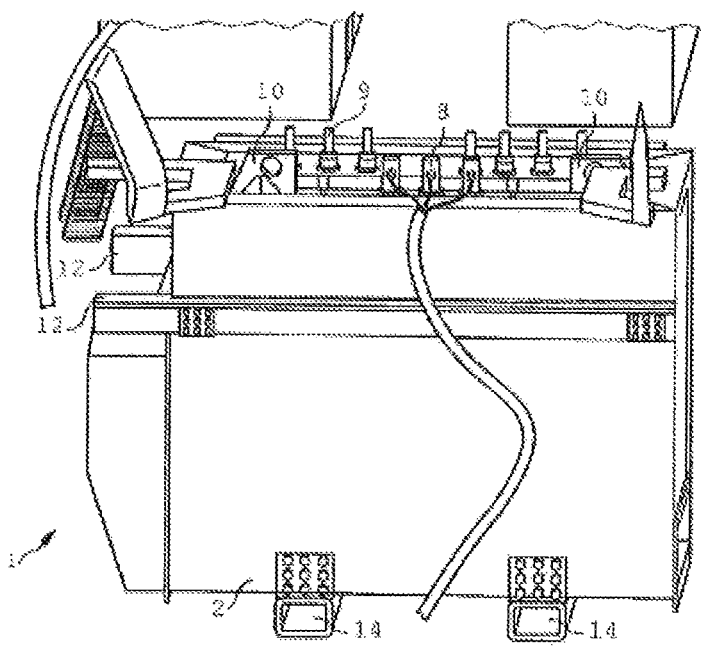
FIG. 5 shows a further cutaway view of a transformer chamber.

FIGS. 3, 4, 5 show further cutaway views of transformer chamber 1 with an explosion safe tank 2. The transformer chamber 1 also include an oil-filled transformer 3 a first opening 4, a second opening 5 an oil pit 6, an explosion plate, a high voltage terminal 8 a low voltage terminal 9 transport rings 10 support rails 12, support beams 14, and cooling fins 31 comparable to those as have been described hereinbefore.

Figure 6:
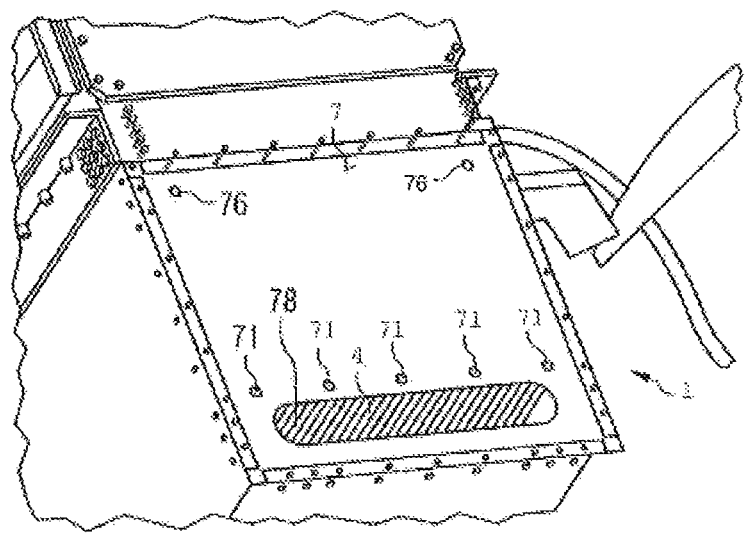
FIG. 6 shows a still further cutaway view of a transformer chamber.

FIG. 6 shows a still further cutaway view of a transformer chamber 1 focusing on its explosion plate 7 above its first opening 4. The explosion plate 7 is made from aluminum and represents a predetermined breaking point, which bursts in case of an explosion and allows release of pressure at a secure location avoiding unpredictable and harmful damage to the transformer chamber 1 and its features. The explosion plate is fixed to the transformer chamber 1 with seven bolts 71, 76 of which five bolts 71 are located along a bottom portion parallel to the first opening 4. A bending section of the explosion plate is created with parallel running slits 78 at the first opening 4. Two deformation bolts 76 hold the explosion plate 7 to the transformer chamber 1 on an upper section of the explosion plate 7. In case of an explosion these two deformation bolts 76 and the explosion plate 7 bends outwardly along the bending section. The bending section works similar to a hinge.

Figure 7:
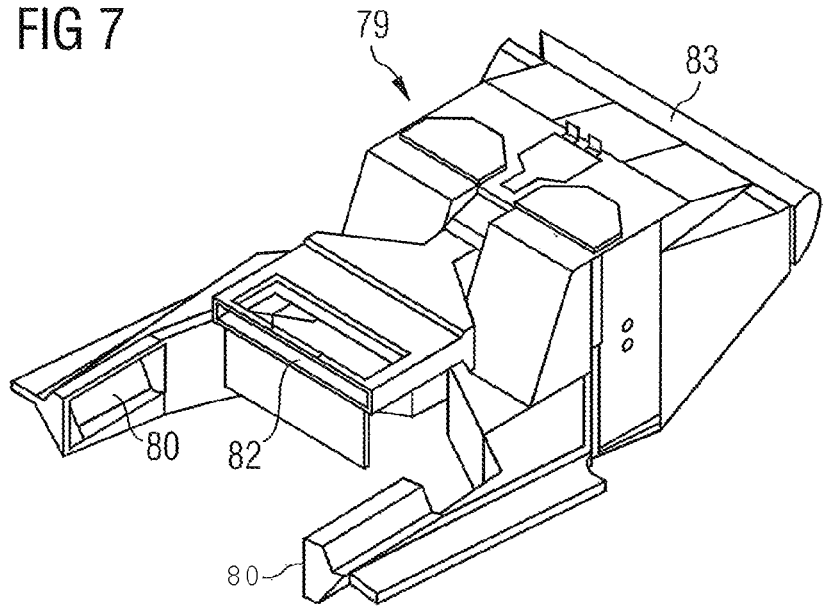
FIG. 7 shows a cooling channel system of a transformer chamber.

FIG. 7 shows a cooling channel system 79 for a transformer chamber. Two inlet interfaces 80 may be connected to transformer chamber's first openings. One outlet interface 82 may be joinable to a second opening of a transformer chamber. A fan may be located behind the outlet interface and create a cooling airflow by sucking in ambient air. This air may then be fed into the transformer chamber through the two inlet interfaces 80, 81 and be received by the outlet interface 82 before it is blown out through the channel outlet 83 of the cooling channel system 79.

Figure 8:
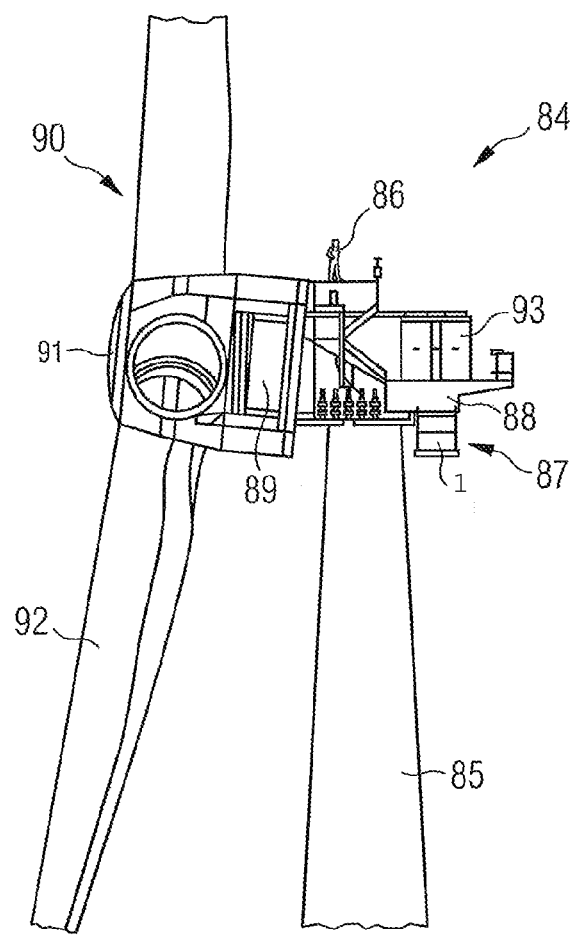
FIG. 8 shows a section of a wind turbine.

FIG. 8 shows a section of a wind turbine 84 comprising a wind turbine tower 85. A person 86 is depicted to give an indication of the size of the wind turbine 84. A wind turbine nacelle 87 is mounted to the top of the wind turbine tower 85. The outer walls of the wind turbine nacelle 87 are not shown. The wind turbine nacelle 87 comprises a support structure and a component bedframe 88, which is bolted to the support structure. However, the component bedframe 88 and the support structure may in an alternative embodiment also be made in one piece.

The support structure is rotatable connected to the wind turbine tower 85 and supports a generator 89 with a wind turbine rotor 90 connected thereto. The wind turbine rotor 90 comprises a hub 91 and blades 92.

The component bedframe 88 and the support structure carry inter alia electrical components 93 such as a converter, communication units and control units. A transformer chamber 1 holding an oil-filled transformer is mounted to the bottom side of the component bedframe 88 in close vicinity to the wind turbine tower 85. The center of mass is located close to the wind turbine tower 85 by positioning the heavy oil-filled transformer close to the wind turbine tower 85. Thus, structural loads on the wind turbine 84, in particular on the wind turbine tower 85, the support structure and the component bedframe 88, may be minimized.

Furthermore, by placing the transformer chamber 1 on the opposite side of the wind turbine rotor 90 the weight of the transformer chamber 1 comprising the oil-filled transformer may counteract the weight of the wind turbine rotor 90. This may additionally reduce structural loads.

The transformer chamber 1 comprises guiding in elements in form of wheels. These wheels may allow an easy movement of the transformer chamber 1 relative to the wind turbine tower 85, which may be used as guidance when the transformer chamber 1 is lowered to the surface or raised therefrom. Guiding the transformer chamber 1 may reduce the security risks associated with swinging masses.

The wind turbine nacelle 87 may additionally comprise a winch with a chain or rope, which is attachable to the transformer chamber 1. This may allow exchanging the transformer chamber 1 without the need of additional cranes.

Figure 9:
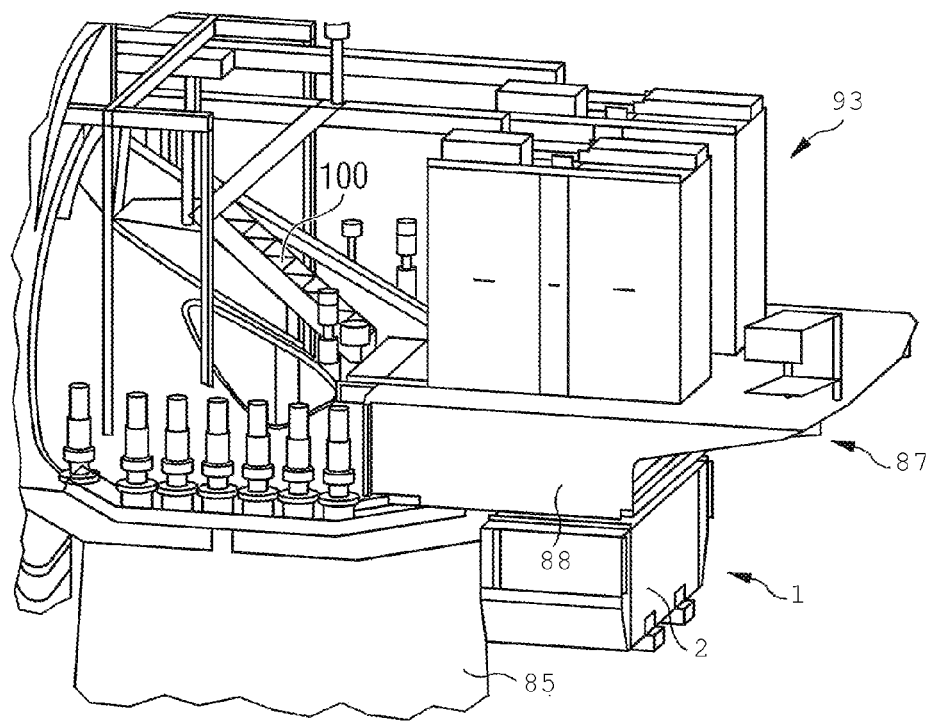
FIG. 9 depicts a wind turbine nacelle.

FIG. 9 depicts a wind turbine nacelle 87 mounted to the top of a wind turbine tower 85. A transformer chamber 1 comprising an explosion safe tank 2 is bolted to a component bedframe 88. A ladder 100 provides ease of access to the transformer chamber 1 and to electrical components 101 from the support structure. The ladder 100 and the placement of the transformer chamber 1 with the transformer therein inside the canopy of the wind turbine nacelle 87 may allow repair work and service to be done even under adverse weather conditions.

Figure 10:
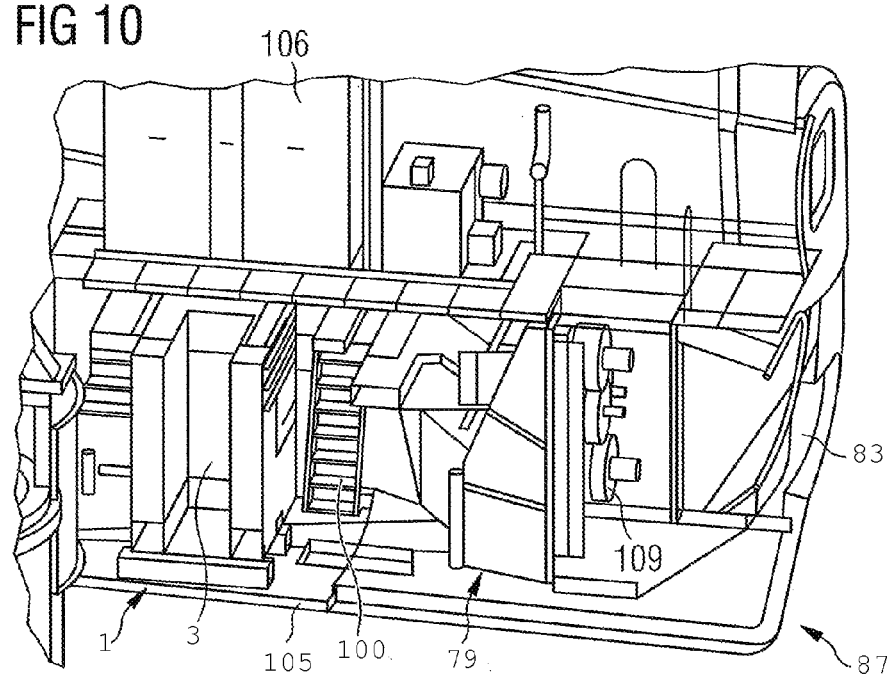
FIG. 10 shows a section of a wind turbine nacelle.

FIG. 10 shows a section of a wind turbine nacelle 87 in a cutaway view. The wind turbine nacelle 87 houses a transformer chamber 1 with an explosion safe tank. The transformer chamber 1 comprises an oil-filled transformer 3 and is attached to a component bedframe of the wind turbine nacelle 87. A hatch 105 is provided such that the transformer chamber 1 may easily be lowered from the wind turbine nacelle 87 to the surface. The wind turbine nacelle 87 further houses electric components 106, e.g. a converter, communication units and control units, which may be arranged in cabinets on a support structure of the wind turbine nacelle 87. The access to the transformer chamber 1 and to the electric components 106 may be facilitated by means of a ladder 100. The wind turbine nacelle 87 further comprises a cooling channel system 79 for the transformer chamber 1. Fans 109 blow ambient air into the cooling channel system 79 and the transformer chamber 1, where it serves to dissipate from the oil-filled transformer 3. The hot air then is guided by the cooling channel system 79 to the channel outlet 83 where it is released to the outside of the wind turbine nacelle 87.

Figure 11:
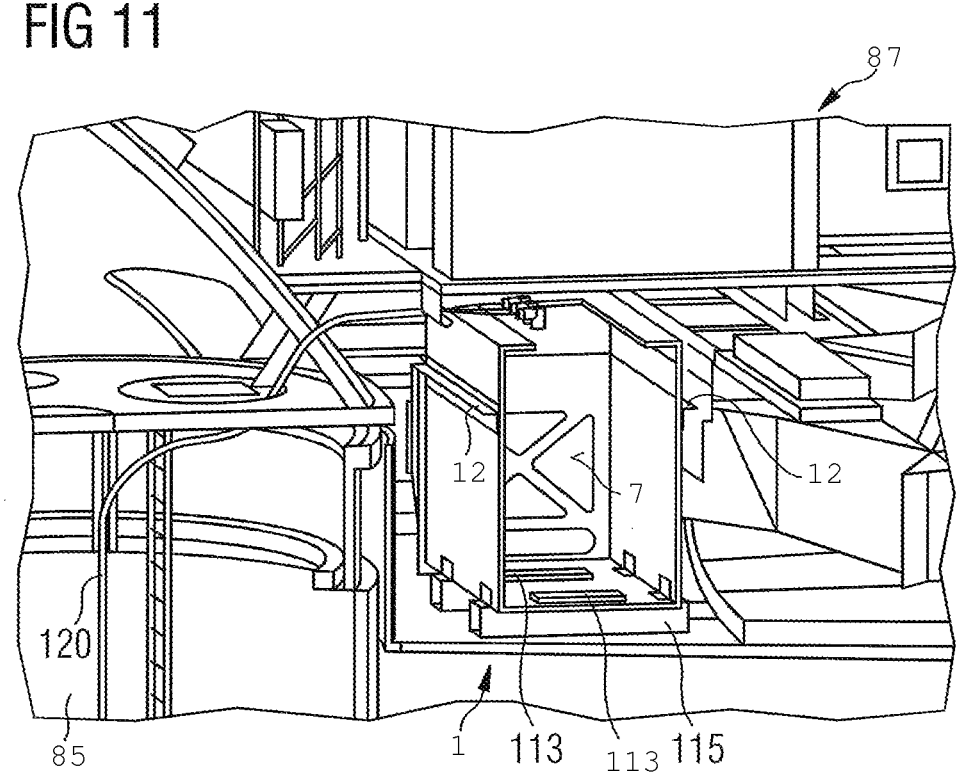
FIG. 11 depicts a section of a wind turbine nacelle.

FIG. 11 depicts a section of a wind turbine nacelle 87 housing a transformer chamber 1. Only parts of the transformer chamber 1 are shown. A transformer (not shown) rests on two pads 113 of the transformer chamber 1. The pads 113 may be made of a resilient material and absorb the vibrations associated with the frequency of the power grid. The material may in particular be adapted to absorb vibrations with a frequency of 50 Hertz or 60 Hertz. A support beam 115 is provided to augment the rigidity of the transformer chamber 1. The transformer chamber 1 is attached to the component bedframe of the wind turbine nacelle 87 with two support rails 12 such that in case of an explosion of the transformer an explosion plate 7 of the transformer chamber 1 may work as a predetermined breaking point and the pressure may be released in a direction laterally of the wind turbine nacelle 87. Thus, harmful damages to other components within the wind turbine nacelle 87 may be avoided or at least reduced. A wind turbine tower 119 supports the wind turbine nacelle 87 and a cable 120 transmits the power generated from a high voltage terminal of the oil-filled transformer along the inside of the wind turbine tower 85 to the main power grid.

Figure 12:
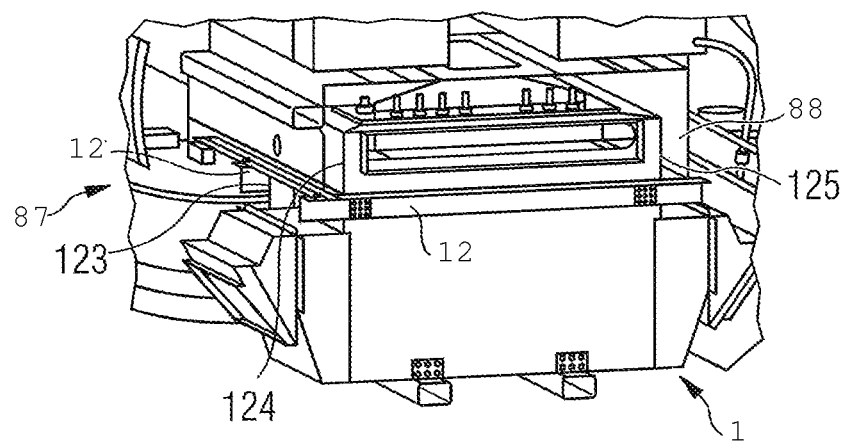
FIG. 12 shows a transformer chamber
Figure 13:
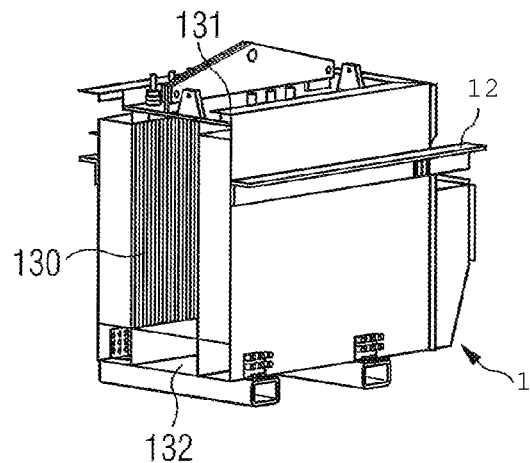
FIG. 13 shows a transformer chamber

FIGS. 12 and 13 show a transformer chamber 1. The transformer chamber 1 comprises L-shaped support rails 12. With these L-shaped support rails 12 the transformer chamber 1 is bolted at four corners 123, 124, 125 to a component bedframe 88 of a wind turbine nacelle 87. The transformer 130 is bolted to the top 131 and the bottom 132 of the transformer chamber 1.

Figure 14:
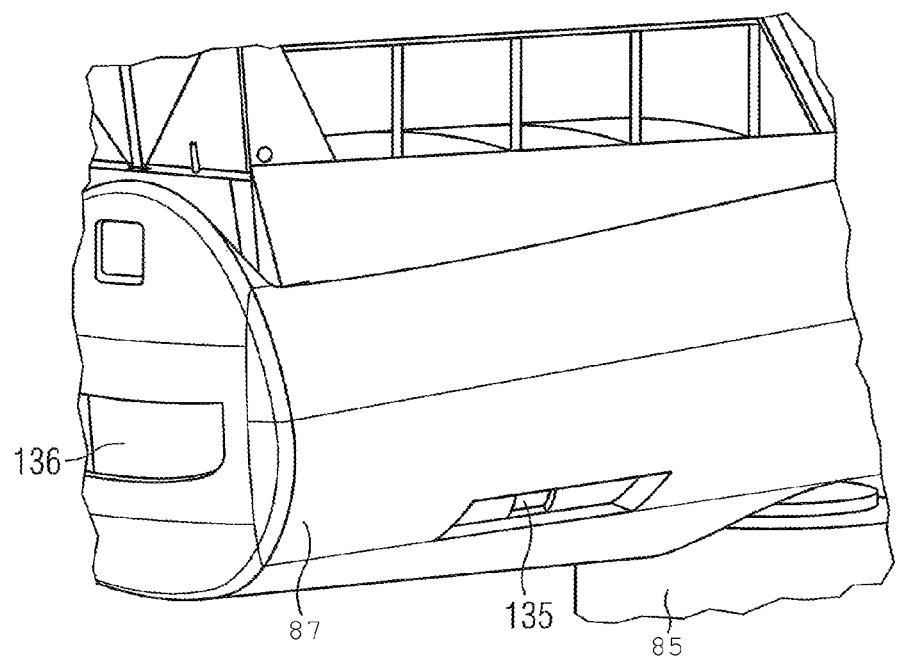
FIG. 14 shows a section of a wind turbine nacelle.

FIG. 14 shows a section of a wind turbine nacelle 87 at the top of a wind turbine tower 85. The wind turbine nacelle 87 comprises an inlet 135 for sucking in ambient air for cooling of components within the wind turbine nacelle 87 and an outlet 136 for blowing out hot air.

While specific embodiments have been described in detail, those with ordinary skill in the art will appreciate that various modifications and alternative to those details could be developed in light of the overall teachings of the disclosure. For example, elements described in association with different embodiments may be combined. Accordingly, the particular arrangements disclosed are meant to be illustrative only and should not be construed as limiting the scope of the claims or disclosure, which are to be given the full breadth of the appended claims, and any and all equivalents thereof. It should be noted that the term "comprising" does not exclude other elements or steps and the use of articles "a" or "an" does not exclude a plurality.

The invention claimed is:

1. A wind turbine, comprising:
   a rotor;
   a nacelle connected to the rotor, wherein the nacelle comprising a component bedframe adapted for receiving a transformer chamber;
   the transformer chamber comprising a liquid-tight tank including an oil-filled transformer and support rails for attaching the transformer chamber to the component bedframe;
   wherein the transformer chamber is detachably connected to the component bedframe;
   wherein the liquid-tight tank is an explosion safe tank and comprising an explosion plate having a predetermined breaking point and a first opening located along a bottom section of the explosion plate, wherein a bending section of the explosion plate is created with parallel running slits at the first opening; and
   wherein a plurality of bolts are located along the bottom section of the explosion plate parallel to the first opening and deformation bolts hold an upper section of the explosion plate to the transformer chamber, wherein in case of an explosion, the deformation bolts and the explosion plate bends outwardly along the bending section.

2. The wind turbine according to claim 1, wherein the oil-filled transformer including low voltage terminals and high voltage terminals, and wherein the low voltage terminals and the high voltage terminals being accessible from a top surface of the transformer chamber.

3. The a wind turbine according to claim 1, wherein the explosion plate is made from aluminum.

4. The wind turbine according to claim 1, comprising: a cooling channel system.

5. The wind turbine according to claim 1, comprising: a hatch.

6. The wind turbine according to claim 1, comprising: a cooling air inlet and a cooling air outlet adapted to provide a cooling air path in the transformer chamber.

7. The wind turbine according to claim 6, comprising: a fan.

8. The wind turbine according to claim 1, wherein the transformer chamber is movable relative to the component bedframe.

9. The wind turbine according to claim 1, wherein the transformer chamber is movable in a direction of gravity when the transformer chamber is detached from the component bedframe.

10. The wind turbine according to claim 1, wherein the transformer chamber further comprises an oil pit.

11. The wind turbine according to claim 1, wherein the transformer chamber further comprises support beams.

* * * * *